United States Patent
Cuevas et al.

[11] Patent Number: 6,120,055
[45] Date of Patent: Sep. 19, 2000

[54] VEHICLE OCCUPANT PROTECTION APPARATUS

[75] Inventors: Jess A. Cuevas, Scottsdale; Ahamd K. Al-Amin, Higley; Bryan W. Shirk, Mesa; Timothy A. Swann, Mesa; Roy D. Vanwynsberghe, Mesa, all of Ariz.

[73] Assignee: TRW Inc., Lyndhurst, Ohio

[21] Appl. No.: 09/039,123

[22] Filed: Mar. 13, 1998

[51] Int. Cl.[7] .................................................. B60R 21/16
[52] U.S. Cl. ...................................... 280/728.2; 280/732
[58] Field of Search ................................ 280/728.2, 732

[56] References Cited

U.S. PATENT DOCUMENTS

| | | | |
|---|---|---|---|
| 5,135,252 | 8/1992 | Suran et al. ............................. | 280/732 |
| 5,433,472 | 7/1995 | Green et al. . | |
| 5,472,230 | 12/1995 | Every, Sr. et al. .................... | 280/728.2 |
| 5,489,116 | 2/1996 | Boag ..................................... | 280/728.2 |
| 5,527,064 | 6/1996 | Kai et al. .............................. | 280/728.2 |
| 5,639,112 | 6/1997 | Phillion et al. . | |
| 5,664,801 | 9/1997 | Gray et al. ........................... | 280/728.2 |
| 5,669,626 | 9/1997 | Bartos et al. ........................ | 280/728.2 |
| 5,791,682 | 8/1998 | Hiramitsu et al. ................... | 280/728.2 |
| 5,851,023 | 12/1998 | Nagata et al. ........................ | 280/728.3 |

OTHER PUBLICATIONS

U.S. Serial No. 08/963,399, filed Nov. 9, 1997, entitled "Vehicle Occupant Protection Apparatus".

*Primary Examiner*—J. J. Swann
*Assistant Examiner*—James S. McClellan
*Attorney, Agent, or Firm*—Tarolli, Sundheim, Covell, Tummino & Szabo L.L.P.

[57] ABSTRACT

An apparatus comprises an inflatable vehicle occupant protection device (14), an inflator (12), and a vehicle part (18). A structural portion (80) of the vehicle part (18) defines a compartment (84) with an open inner end (86) and an opposed, open outer end (88). The protection device (14) has an installed position received at least partially in the compartment (84) and is inflatable outward through the open outer end (88) of the compartment (84). The inflator (12) also has an installed position received at least partially in the compartment (84), and is movable to its installed position through the open inner end (86) of the compartment. A first fastener structure (120) is located on the structural portion (80) of the vehicle part (18). A second fastener structure (60) is located on the inflator (12). The fastener structures (120, 60) are configured to snap together to establish a mechanical interlock between the inflator (12) and the structural portion (80) of the vehicle part (18) upon movement of the inflator (12) to its installed position.

8 Claims, 3 Drawing Sheets

VEHICLE OCCUPANT PROTECTION APPARATUS

FIELD OF THE INVENTION

The present invention relates to an apparatus for protecting an occupant of a vehicle, and particularly relates to an apparatus including an inflator for an inflatable vehicle occupant protection device.

BACKGROUND OF THE INVENTION

An inflatable vehicle occupant protection device, such as an air bag, is part of an apparatus which further includes a crash sensor and an inflator. The crash sensor senses vehicle conditions that indicate the occurrence of a crash. When the crash sensor senses a crash-indicating condition of at least a predetermined threshold level, the inflator is actuated. The inflator then emits inflation fluid which inflates the air bag into the vehicle occupant compartment to help protect an occupant of the vehicle.

An air bag and an inflator are typically assembled together as parts of an air bag module which is separate from the crash sensor. The module is installed on a vehicle part adjacent to the vehicle occupant compartment.

SUMMARY OF THE INVENTION

In accordance with the present invention, an apparatus comprises a vehicle part, an inflatable vehicle occupant protection device, and an inflator. A structural portion of the vehicle part defines a compartment with an open inner end and an opposed, open outer end. The protection device has an installed position received at least partially in the compartment, and is inflatable outward through the open outer end of the compartment. The inflator also has an installed position received at least partially in the compartment. The inflator is movable to its installed position through the open inner end of the compartment.

A first fastener structure is located on the structural portion of the vehicle part. A second fastener structure is located on the inflator. The fastener structures are configured to snap together to establish a mechanical interlock between the inflator and the vehicle part upon movement of the inflator to its installed position.

In a preferred embodiment of the present invention, the first fastener structure comprises a spring and a latch. The spring and the latch are received in a cylinder which is mounted on the structural portion of the vehicle part. The second fastener structure comprises a lug projecting from the inflator. The lug is movable against the latch so as to move the latch inward of the cylinder against a bias of the spring upon movement of the inflator into the compartment. When the inflator reaches its installed position in the compartment, the latch snaps back outward of the cylinder under the influence of the spring, and thus moves into a position in which it blocks movement of the inflator back outward from the compartment.

BRIEF DESCRIPTION OF THE DRAWINGS

The foregoing and other features of the present invention will becomes apparent to one skilled in the art to which the present invention relates upon reading the following description of the invention with reference to the accompanying drawings, wherein.

DESCRIPTION OF A PREFERRED EMBODIMENT

Figure 1:
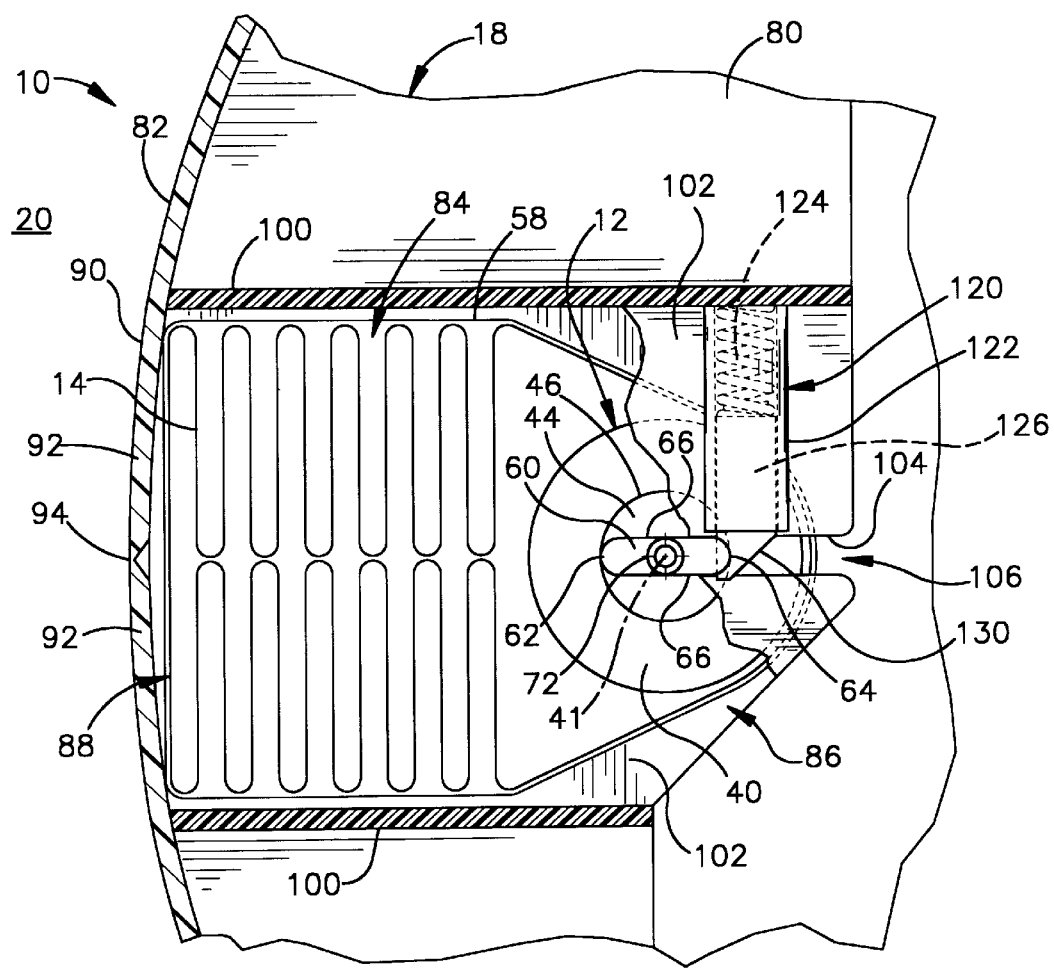
FIG. 1 is a partial view of an apparatus comprising a preferred embodiment of the present invention.

An apparatus 10 comprising a preferred embodiment of the present invention is shown partially in FIG. 1. The apparatus 10 includes an inflator 12 and a particular type of inflatable vehicle occupant protection device 14 which is commonly referred to as an air bag. The inflator 12 and the air bag 14 are mounted in a vehicle part 18 adjacent to the vehicle occupant compartment 20.

Figure 2:
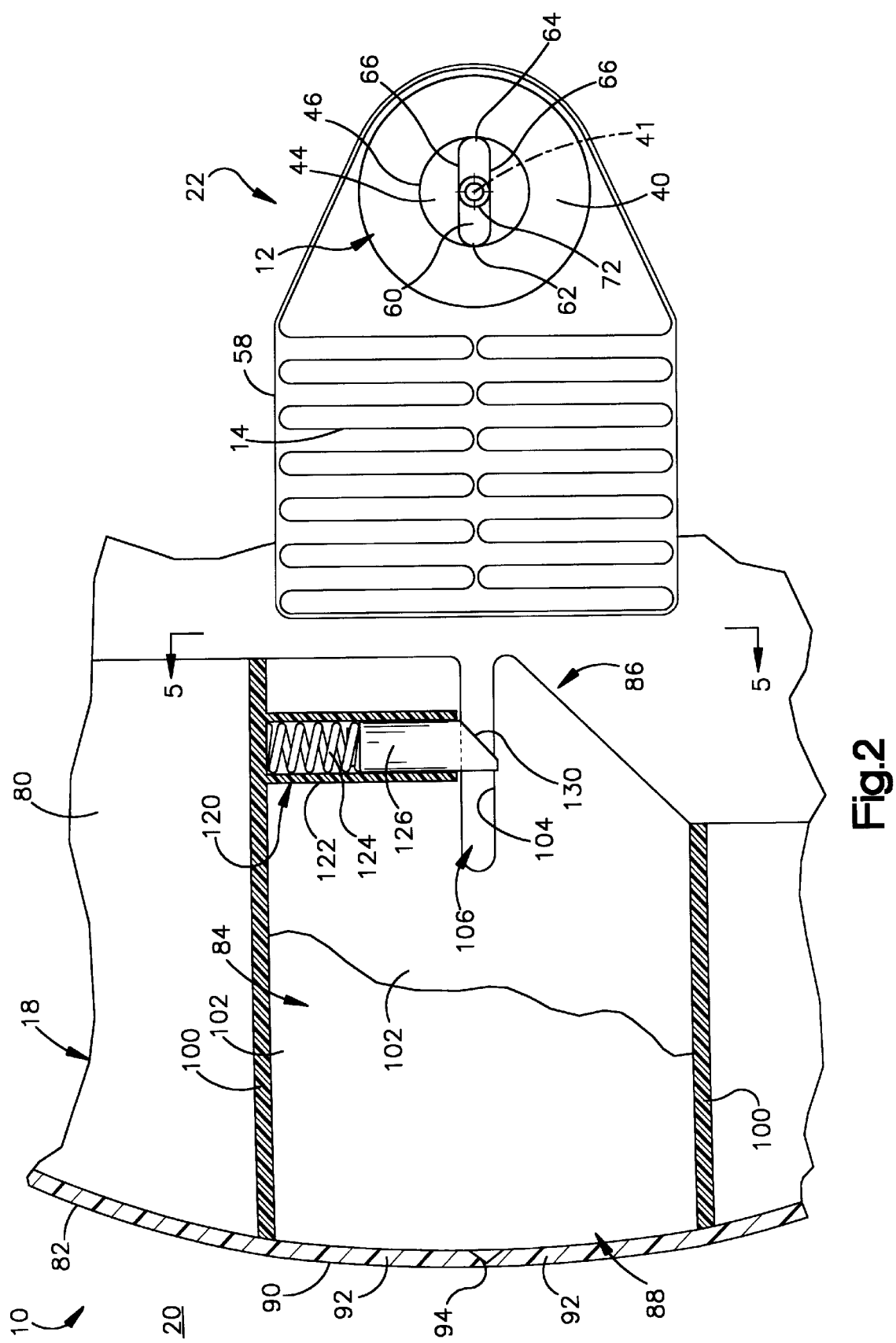
FIG. 2 is a view similar to FIG. 1 showing parts in different positions.

In the preferred embodiment of the present invention shown in the drawings, the vehicle part 18 is the instrument panel. The inflator 12 and the air bag 14 are parts of an air bag module 22. The module 22 is an assembly of parts that are interconnected separately from the instrument panel 18, as shown in FIG. 2, and is installed in the instrument panel 18, as shown in FIG. 1. When the air bag 14 is being inflated, it moves from the instrument panel 18 into the vehicle occupant compartment 20. The air bag 14 then restrains movement of an occupant of the vehicle to help protect the occupant from a forceful impact with the instrument panel 18 or other parts of the vehicle.

The air bag 14, which is shown schematically in FIG. 1, may be constructed of one or more panels of any suitable air bag material known in the art. Such materials include woven materials and plastic films. The panels of air bag material are interconnected along seams (not shown) that are formed by stitches, ultrasonic welds, adhesives, heat-staking, or the like, depending on the particular material of which the panels are formed. Preferably, the air bag 14 is constructed of panels formed of a nylon fabric which is coated with silicone.

The inflator 12 is located within the air bag 14, and contains a source of inflation fluid for inflating the air bag 14. As known in the art, the inflator 12 may contain an ignitable gas generating material which, when ignited, generates a large volume of inflation gas. The inflator 12 may alternatively contain a stored quantity of pressurized inflation fluid, or a combination of pressurized inflation fluid and ignitable material for heating the inflation fluid.

Figure 3:
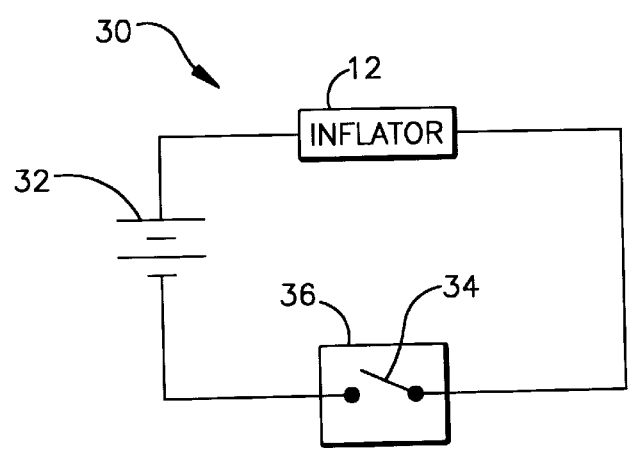
FIG. 3 is a schematic view of an electrical circuit including a part of the apparatus of FIG. 1.

As shown schematically in FIG. 3, the inflator 12 is included in an electrical circuit 30 with a power source 32 and a normally open switch 34. The power source 32 is preferably the vehicle battery and/or a capacitor. The switch 34 is part of a sensor 36 which senses a vehicle condition indicating the occurrence of a vehicle crash. Such a condition may comprise, for example, sudden vehicle deceleration caused by a crash. If the crash-indicating condition is at or above a predetermined threshold level, it indicates the occurrence of a crash having at least a predetermined threshold level of severity. The threshold level of crash severity is a level at which inflation of the air bag 14 is desired to restrain movement of an occupant of the vehicle, as described above. The switch 34 then closes and electric current is directed through the inflator 12 to actuate the inflator 12. As a result, the inflator 12 rapidly emits a large volume of inflation fluid which flows into the air bag 14 to inflate the air bag 14.

Figure 4:
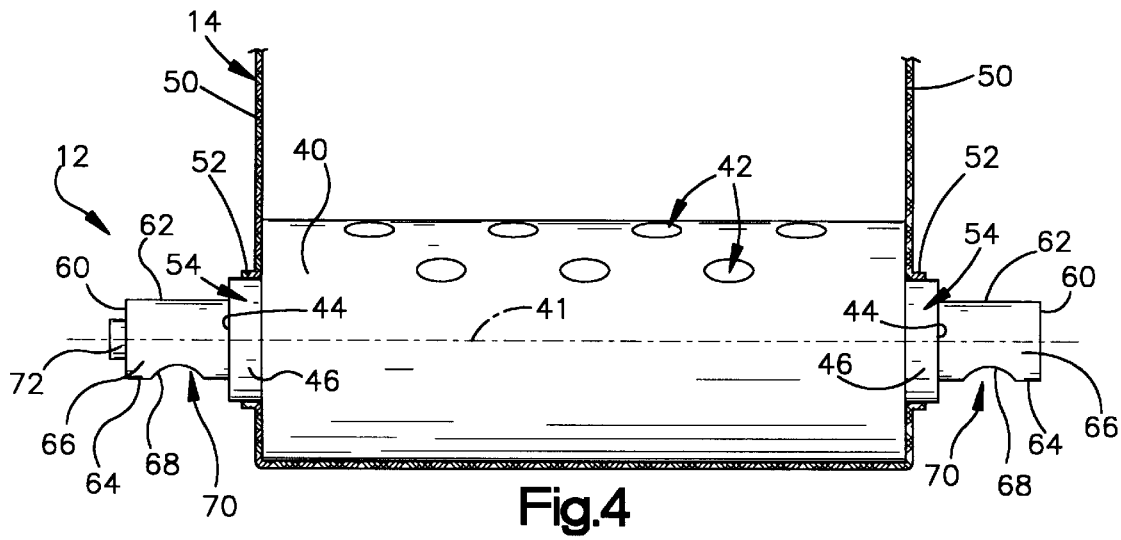
FIG. 4 is a top view, partly in section, of parts of the apparatus of FIG. 1.

The inflator 12 in the preferred embodiment of the present invention has a major body portion 40 with a cylindrical shape centered on an axis 41. The major body portion 40 of the inflator 12 contains the source of inflation fluid, and has a plurality of inflation fluid outlet openings 42 (FIG. 4). A pair of clamping bosses 44 project from the opposite ends of the major body portion 40. Each clamping boss 44 has a short cylindrical shape with a peripheral surface 46 centered on the axis 41.

As shown partially in FIG. 4, the air bag 14 has a pair of opposite side panels 50. The side panels 50 have annular inner edge portions 52 defining a corresponding pair of opposed circular openings 54. When the inflator 12 is received in the air bag 14, the annular inner edge portions 52 of the air bag 14 are clamped against the peripheral surfaces 46 of the clamping bosses 44. This can be accomplished in any suitable manner known in the art, such as by the use of hose clamps. A rupturable plastic cover 58 (FIGS. 1 and 2) encloses the air bag 14 and the inflator 12 in a known manner.

The inflator 12 further has a pair of mounting lugs 60 projecting oppositely from the clamping bosses 54. Each mounting lug 60 has an arcuate front edge surface 62, an arcuate rear edge surface 64, and a pair of planar, parallel opposite side surfaces 66. Each rear edge surface 64 has a recessed portion 68 defining a groove 70 extending between the opposite side surfaces 66.

An initiator receptacle 72 extends axially inward through one of the mounting lugs 60. The receptacle 72 is sized and shaped to receive an electrically actuatable squib (not shown) for connection of the inflator 12 in the electrical circuit 30 of FIG. 3.

The instrument panel 18 includes a structural frame 80 and a trim panel 82. The structural frame 80 defines a compartment 84 for containing the air bag module 22. The compartment 84 has an open inner end 86 for receiving the air bag module 22, and has an open outer end 88 which functions as a deployment opening for deployment of the air bag 14 into the vehicle occupant compartment 20. The trim panel 82 covers and conceals the structural frame 80 from view, and includes a deployment panel 90 which extends over the outer end 88 of the compartment 84. Both the structural frame 80 and the trim panel 82 are formed of molded plastic material, with the structural frame 80 being formed of a material that is more rigid than that of the trim panel 82.

The deployment panel 90 includes a pair of pivotal deployment doors 92. Each deployment door 92 is bounded on three sides by a thinned section 94 of the deployment panel 90. The thinned section 94 ruptures in a known manner under the influence of inflation fluid pressure forces applied by the inflating air bag 14. Alternatively, the deployment panel 90 may have any other suitable structure known in the art.

Figure 5:
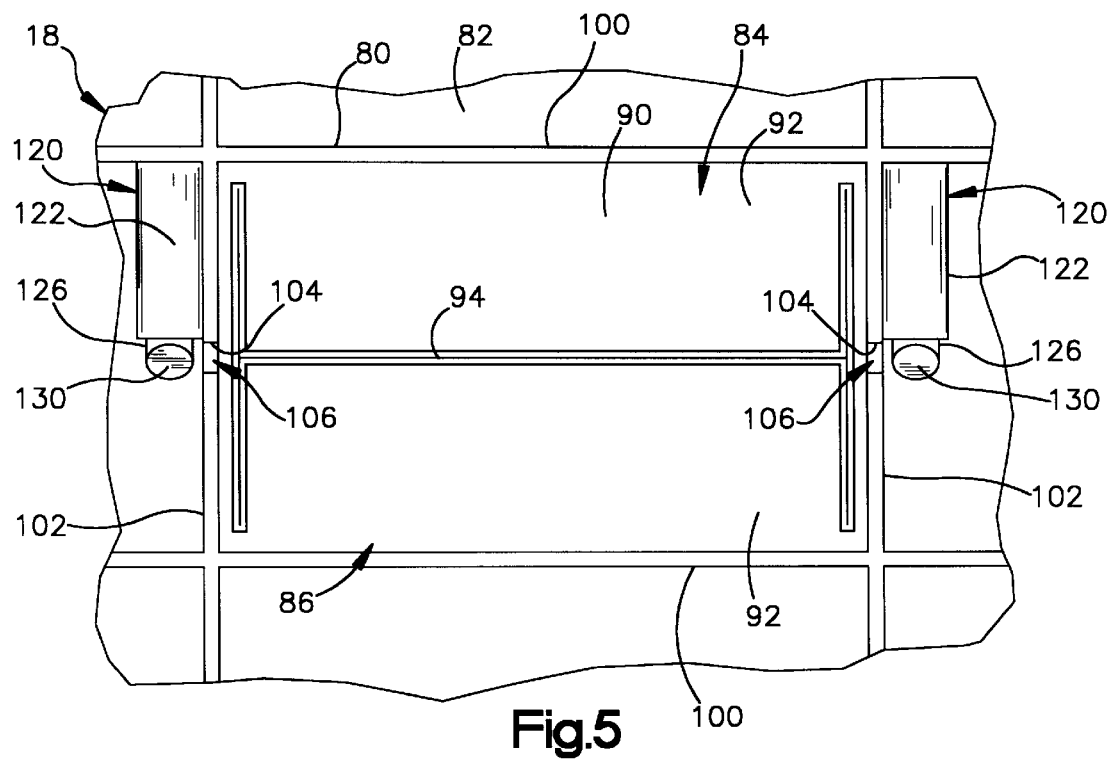
FIG. 5 is a view taken on line 5—5 of FIG. 2.

As best shown in FIG. 5, the compartment 84 in the structural frame 80 has a rectangular peripheral shape defined by a pair of opposite side walls 100 and a pair of opposite end walls 102. Each end wall 102 has an inner edge surface 104 defining a slot 106. The slots 106 extend from the inner end 86 of the compartment 84 toward the outer end 88.

The apparatus 10 further includes a pair of latch assemblies 120. Each latch assembly 120 includes a cylinder 122, a spring 124, and a latch 126 which is movable inward of the cylinder 122 against a bias of the spring 124. The cylinders 122 are portions of the structural frame 80 that are located outside the compartment 84 beside the opposite end walls 102. Each latch 126 projects outward from the corresponding cylinder 122, and has a cam follower surface 130 located beside the slot 106 in the adjacent end wall 102.

The air bag module 22 is moved into the compartment 84 through the open inner end 86 of the compartment 84. When the module 22 reaches the installed position of FIG. 1, the air bag 14 and the inflator 12 are both received fully within the compartment 84. However, the air bag 14 could alternatively project a short distance outward through the open outer end 88 of the compartment 80 adjacent to the deployment doors 92. The inflator 12 could alternatively project a short distance outward through the open inner end 86 of compartment 84.

The inflator 12 becomes interlocked with the structural frame 80 upon engagement of the lugs 60 with the fastener assemblies 120. More specifically, the lugs 60 at the opposite ends of the inflator 12 are received in the slots 106 in the opposite end walls 102, and are moved against the latches 126 in the latch assemblies 120. The forward edge surfaces 62 of the lugs 60 act as cam surfaces which slide against the cam follower surfaces 130. The lugs 60 thus cam the latches 126 inward of the cylinders 122. Preferably, the opposite side surfaces 66 of the lugs 60 slide firmly against the inner edge surfaces 104 of the end walls 102. The lugs 60 are thus fitted closely within the slots 106 to inhibit rattling or vibration of the lugs 60 relative to the end walls 102.

When the module 22 reaches the installed position of FIG. 1, the latches 126 snap back outward of the cylinders 122 under the influence of the springs 124. The latches 126 then extend past the rear edge surfaces 64 of the lugs 60 to block movement of the lugs 60 outward of the slots 106, and thereby to block movement of the module 22 outward of compartment 84. In accordance with a particular feature of the present invention, the latches 126 are configured to fit closely within the grooves 70 at the rear edge surfaces 64 of the lugs 60. This also inhibits rattling and relative vibration of the interlocked parts of the apparatus 10.

From the above description of the invention, those skilled in the art will perceive improvements, changes and modifications. Such improvements, changes and modifications within the skill of the art are intended to be covered by the appended claims.

Having described the invention, the following is claimed:
1. Apparatus comprising:
   a vehicle part having a structural portion defining a compartment, said compartment having an open inner end and an opposed, open outer end;
   an inflatable vehicle occupant protection device having an installed position received at least partially in said compartment, said protection device being inflatable outward through said open outer end of said compartment;
   an inflator having an installed position received at least partially in said compartment, said inflator being movable to its installed position through said open inner end of said compartment;
   a first fastener structure on said structural portion of said vehicle part; and
   a second fastener structure on said inflator;
      said fastener structures being configured to snap together to establish a mechanical interlock between said inflator and said vehicle part upon movement of said inflator to its installed position;
      wherein said first fastener structure comprises a cylinder, a spring disposed in said cylinder, and a latch supported for movement by said cylinder against a bias of said spring;
      said second fastener structure comprising a lug which is movable against said latch so as to move said latch within said cylinder against said bias of said spring upon movement of said inflator toward its installed position.

2. Apparatus as defined in claim 1 wherein said structural portion of said vehicle part defines a slot in which said lug is receivable upon said movement of said inflator.

3. Apparatus as defined in claim 1 wherein said lug has a groove which receives said latch when said inflator reaches said installed position.

4. Apparatus as defined in claim 1 wherein said vehicle part further has a trim portion covering said structural portion, said trim portion of said vehicle part comprising a pivotal deployment door structure extending across said open outer end of said compartment.

5. Apparatus as defined in claim 4 wherein said vehicle part is an instrument panel.

6. Apparatus as defined in claim 1 wherein said protection device and said inflator are interconnected separately from said vehicle part, whereby said protection device and said inflator are movable together to said installed positions.

7. Apparatus as defined in claim 1 wherein said protection device has a pair of spaced-apart side panel portions with a corresponding pair of opposed openings, said inflator being received within said protection device and having a pair of opposite end portions projecting outward through said openings.

8. Apparatus as defined in claim 7 wherein said first fastener structure is one of a pair of first fastener structures which are spaced apart across said compartment, said second fastener structure being one of a pair of second fastener structures at said opposite end portions of said inflator.

\* \* \* \* \*